United States Patent [19]

Whitehead

[11] 4,455,484
[45] Jun. 19, 1984

[54] IDENTIFICATION CARD WHICH IS MAGNETICALLY CODED TO PREVENT COUNTERFEITING

[76] Inventor: Edwin N. Whitehead, Alexandria, Va.

[21] Appl. No.: 371,322

[22] Filed: Apr. 23, 1982

Related U.S. Application Data

[63] Continuation-in-part of Ser. No. 236,354, Feb. 20, 1981, abandoned, which is a continuation-in-part of Ser. No. 911,588, May 31, 1978, Pat. No. 4,253,017, which is a continuation-in-part of Ser. No. 487,757, Jul. 11, 1974, Pat. No. 4,097,219, which is a continuation-in-part of Ser. No. 431,803, Jan. 8, 1974, abandoned, which is a continuation of Ser. No. 223,649, Feb. 4, 1972, abandoned.

[51] Int. Cl.$^3$ ............................................. G06K 19/06
[52] U.S. Cl. .................................. 235/493; 235/449; 235/450
[58] Field of Search .................... 235/449, 450, 493; 360/112

[56] References Cited

U.S. PATENT DOCUMENTS

4,253,017 9/1981 Whitehead .................. 235/449

Primary Examiner—Harold I. Pitts
Attorney, Agent, or Firm—William D. Hall

[57] ABSTRACT

An identification card includes a plurality of magnetizable spots, each spot comprising two portions of opposite polarity spaced apart by a distance $d_1$. Adjacent spots are spaced apart such that the distance $d_2$ between a pole on one spot and an oppositely magnetized pole on an adjacent spot is less than the distance $d_1$. The direction of magnetization of each spot is determined by a corresponding horseshoe core magnetizing assembly. With the magnetizing assembly moved proximate to the corresponding spot, a current is passed in either of two directions through a coil wound about the horseshoe core, which action magnetizes a corresponding spot in either of two directions. A plurality p of the q spots represent binary inputs which are to be read. The remaining (q-p) spots are dummy spots which are not to be read and can be magnetized in any direction in order to confound a counterfeiter.

29 Claims, 10 Drawing Figures

IDENTIFICATION CARD WHICH IS MAGNETICALLY CODED TO PREVENT COUNTERFEITING

RELATED APPLICATIONS

This application is a continuation-in-part of my prior copending application, Ser. No. 236,354, filed Feb. 20, 1981, now abandoned, entitled "Magnetically Coded Identification Card, which, in turn, is a continuation-in-part of my prior copending application Ser. No. 911,588, filed May 31, 1978, entitled "Magnetically Coded Identification fication Card", now U.S. Pat. No. 4,253,017, issued Feb. 24, 1981, which in turn is a continuation-in-part of my prior U.S. patent application Ser. No. 487,757, filed July 11, 1974, entitled "Process for preparing an Identification Card", now U.S. Pat. No. 4,097,219, issued June 27, 1978, which, in turn, is a continuation-in-part of my prior copending application Ser. No. 431,803, filed Jan. 8, 1974, entitled "Improved Identification Card", now abandoned, which, in turn, is a streamlined continuation of my application Ser. No. 223,649, filed Feb. 4, 1972, entitled "Improved Identification Card", now abandoned.

This invention relates to tamper-proof identification cards. In particular, this invention relates to identification cards having a core which can be magnetically encoded in a manner difficult to counterfeit and having information encoded thereon which can be read by an optical character recognition reader.

BACKGROUND OF THE INVENTION

Identification cards have been the subject of considerable counterfeiting. For example, according to many publications and Social Security Officials, forged Treasury checks and Welfare/Health fraud using counterfeit identification cards is rampant. A counterfeit and tamper-proof Social Security card would help prevent this fraud. Thus, it is highly desirable to provide an identification card that is difficult to counterfeit.

Moreover, even an identification card which cannot be counterfeited can be misused. For example, a person holding a valid passport or a valid permanent resident card can send it to someone outside of the country who may use it for entry purposes, if the customs agent does not recognize that the user of the passport (or permanent resident card) is a different person from the person whose picture and/or signature appears on the passport. Therefore, it is desirable to have an identification card which indicates whether its last use was for ingress or egress to or from the country, and which gives other information intended to prevent misuse.

SUMMARY OF THE INVENTION

Known systems for protecting against identification card misuse have not addressed the various problems. In such prior systems, relating to counterfeiting, there must be other means with which to connect a particular card with the person to whom it was issued. This can be accomplished by magnetically coding the card with the bearer's identification number (e.g., Social Security number). Further protection from identification card misuse can be obtained by typing the identification number on a thermoplastic cover of the identification card using an optical character recognition (OCR) type style like that used by banks to identify their depositors. Instead of typing, printing or other recording methods may be used. In one form of the invention, the number may be applied to a layer of the card which is covered by one or more outer transparent layers. Thus, when a card so constructed is being used for identification purposes, the authenticity of the card can be verified by manually pushing buttons on a keyboard or by using an OCR reader to read the identification number typed, printed or stamped onto the card. The numbers can then be compared to see if they are the same number as magnetically coded.

One embodiment of this invention provides an identification card having a layer which can be magnetically coded, and is designed such that the coding can be changed at will from time to time to indicate different information, for example, in the case of a passport, whether the last use of the card was for egress or for ingress, the date of such egress or ingress, and the place thereof. When a person entering the country presents the magnetically encoded passport to a customs agent, the agent would immediately place it in a reading machine which would check the coding of the card (which is magnetically coded) against the bearer's Social Security number or the passport number, to see if the card is valid. The leds of the reading machine would show if the last use of the card was for ingress or egress. If the leds indicated that the last use of the card had been for ingress, the agent would be put on notice to investigate the person attempting to come into the country with the card. Other types of variable information could be coded on the card, depending on the use of the card.

The foregoing is accomplished by providing the core of the card with a large number of spots, each of which has two portions. One of these portions is magnetized with one polarity, and the second of these portions is magnetized with the opposite polarity. A selected group of these spots can be magnetized to represent the identification number of the card. Other groups of spots may represent other information.

Both fixed and variable information may be recorded in the above fashion. Some examples of possible fixed information are the identification number and the expiration date of the card. This information is considered fixed since it remains the same throughout the life of the card. Some information may change from time to time such as the last port of entry or egress in the case of a passport, and the last date of use; and this is "variable" information.

The date magnetically recorded on the card can be read by a Hall effect device or by induction, when using a device comprising a plurality of horseshoe-shaped soft iron cores, one core for each of said spots. In the latter device each individual core receives magnetic flux therethrough in one direction, or the opposite direction, depending upon which portion of the spot is north and which portion is south. By employing a "Hall effect" device or by induction, the magnetic flux is converted into a voltage which is positive when one portion of the spot is north and negative when that portion of the spot is south. The voltages representing each spot provides the means with which to read the magnetically coded information on the card.

The device for reading the card described above may also be provided with means for changing the information recorded on the card. For example, the device may be capable of erasing the data representing the last port of ingress or egress and replacing it with new data. This is done, after the card has been read and the leds on the panel of the reader have displayed the information on the card, by energizing coils on the horseshoe magnets in the required manner to magnetize the spots to represent the new information as desired.

The card can also be first encoded by the above device. The coils, one for each spot that may convey information, can be attached to an input panel, such as a panel of pushbuttons. The information desired to be stored on the card can be punched into the pushbuttons. When a master switch is thrown, the horseshoe cores would magnetize all the spots at once.

As mentioned above to further deter counterfeithers, dummy horseshoe cores and coils may be scattered throughout the endocing head. These dummy horseshoe cores would have their magnetic orientation determined at random and would not be attached to the input means. Therefore, the corresponding spots would not be used to convey any information, but would confuse potential counterfeiters.

The fixed information conveyed by the card can also be printed on the card in a manner such that it can be read by an OCR reader as discussed above. The OCR type style used can be that as commonly found in banks and retail stores today. Suitable OCR readers are on the market and available from a number of U.S.A. manufacturers. The readings from the OCR reader and the horseshoe cores can be compared by a comparison device. If the output of the comparison device indicates that the number recorded magnetically corresponds with the printed number, the operator will be notified by a green light that the card is authentic. If the readings from the OCR reader and the horseshoe cores are different, the comparison device will activate warning means to signal the operator that the card is not genuine.

DESCRIPTION OF PREFERRED EMBODIMENTS

Figure 1:
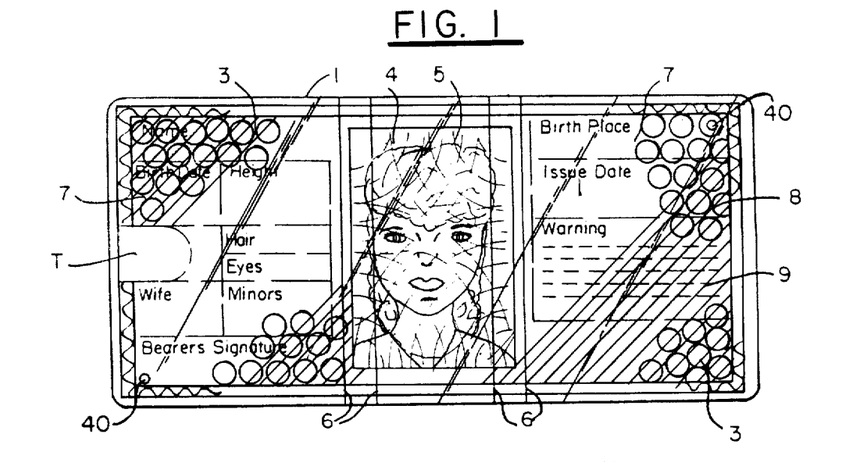
FIG. 1 is a top view of an embodiment of an identification card according to this invention.
Figure 2:
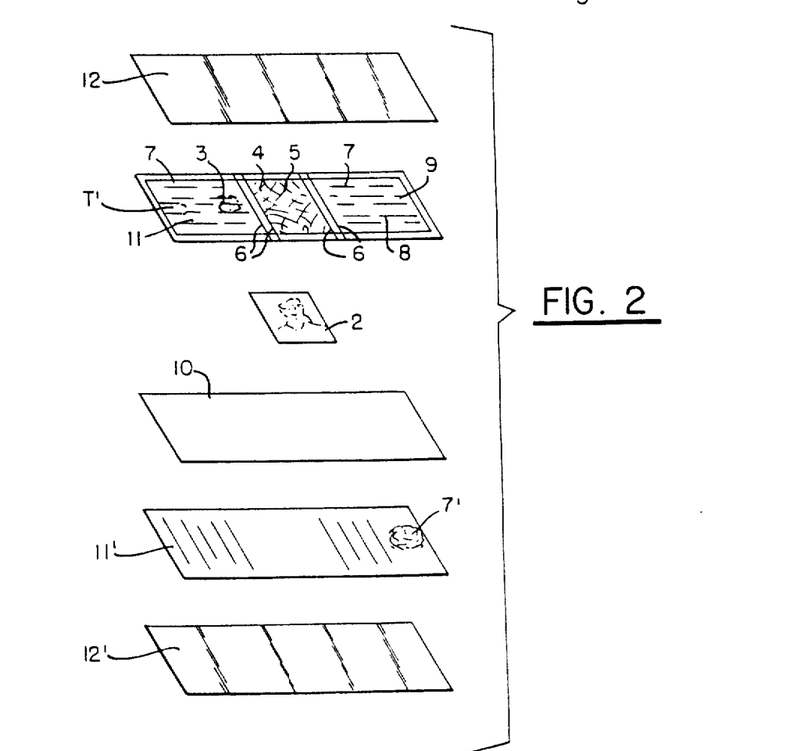
FIG. 2 shows the various laminations that are fused together to form the identification card illustrated in FIG. 1

Referring to FIGS. 1 and 2, there is illustrated a passport identification card 1 embodying the teachings of the present invention. The core 10, which can be white vinyl coated magnetic steel, like the cobalt-vanadium-iron alloy called Vicalloy, has a photographic record 2 bearing an image, identification picture, or other desired record placed thereon in contact with and overlying the central portion of the core 10. Overlying the upper surface of the core 10 and the photographic record 2 is a transparent thermoplastic sheet 11 which bears a design marking and/or desired printed information. Preferably this design marking comprises two sets of design markings, one set located on each side of sheet 11. Sheet 11 bears on the underside thereof a number of different design markings 3, 4, 5, each being preferably of a different color. The markings 8, 9, on the upper surface of this same sheet must be in perfect register with the markings 3, 4, 5 on the underside of the sheet when observed through transparent thermoplastic sheet 11. That is, the printing would be made up of two sets of lines, part on the upper surface of sheet 11 (8 or 9) and part on the under side of sheet 11 (3, 4 or 5), making a complete pattern when viewed through the transparent sheet.

Underlying core 10 is sheet 11' which can contain additional information 7'. In addition, sheets 12 and 12' are provided to encase sheets 11 and 11' and core 10. Sheets 12 and 12' help eliminate the possibility of alteration of the printed matter on sheets 11 and 11'. Sheets 12 and 12' can also be comprised of a thermoplastic material. It is preferred in the practice of this invention that there be positioned the same number of sheets having the same thickness on each side of core 10 to prevent the identification card from curling.

Once thermoplastic sheets 12, 11 and 11', 12' are placed on each side of 10, forming what might be called a sandwich, the entire assembly is placed in a flat platen type of oil hydraulic press where suitable heat and pressure are applied to produce the unitary identification card 1 of my present invention.

Gold threads 6 are provided on the underside of sheet 11 so as to be in direct contact with the photographic record, see U.S. Pat. No. 2,588,067 entitled "Identification Card", and issued to me on Mar. 4, 1952. This acts as additional protection against counterfeiting since photographic record 2 cannot be easily replaced without disturbing gold threads 6, thus making the replacement noticeable.

After identification card 1 has been laminated, holes 40 are punched through the card in opposite corners as shown in FIG. 1. Holes 40 are used to properly align identification card 1 within the encoding and reading devices as card 1 is being encoded and read. The encoding and reading devices may have rods that protrude through holes 40 when the encoding and reading devices are operating to assure proper alignment between identification card 1 and the encoding and reading devices.

Figure 3:
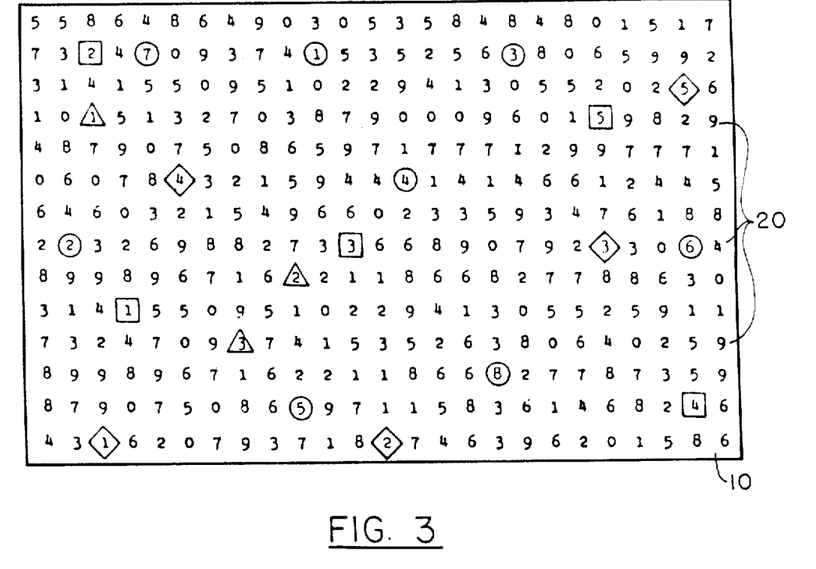
FIG. 3 illustrates an arrangement of "spots" on the core of an identification card which can be used to convey multiple items of information.
Figure 4:
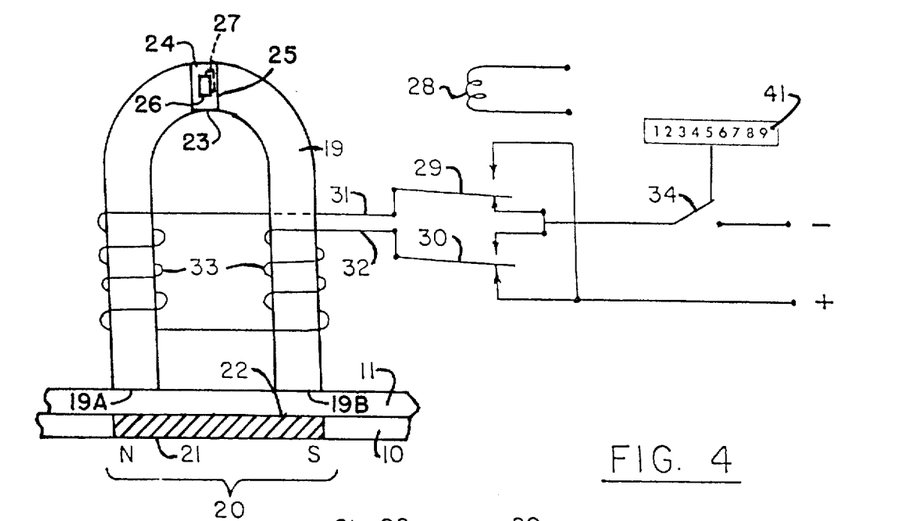
FIG. 4 illustrates a cross-section of a card according to this invention and illustrates a "Hall effect" device which can be used in conjunction with the card.
Figure 6:
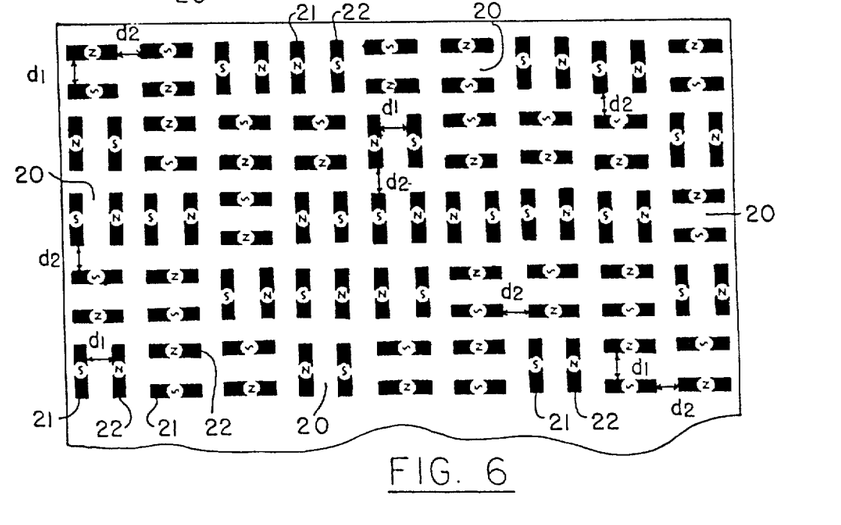
FIG. 6 illustrates a portion of an arrangement of spots on a core which can be used to convey an identification number of other information.

In FIGS. 3 and 6, core 10 has a plurality of q spots 20 (represented by numbers in FIG. 3), each of which has two end portions 21 and 22 as shown in FIG. 4. The end portions 21 and 22 for each spot are oppositely magnetized (i.e., one end portion is referred to as a north pole and the other end portion being a south pole). Thus for each spot 20 on the card, one of the magnetized portions is always magnetized in reverse polarity from the other. Spots 20 can be oriented in any direction in relation to each other desired; however, if it is desired to concentrate as many spots 20 as possible in a limited area, the N/S poles of each spot 20 should be staggered and at right angles to adjacent spots 20 as shown in FIG. 6.

Figure 6A:
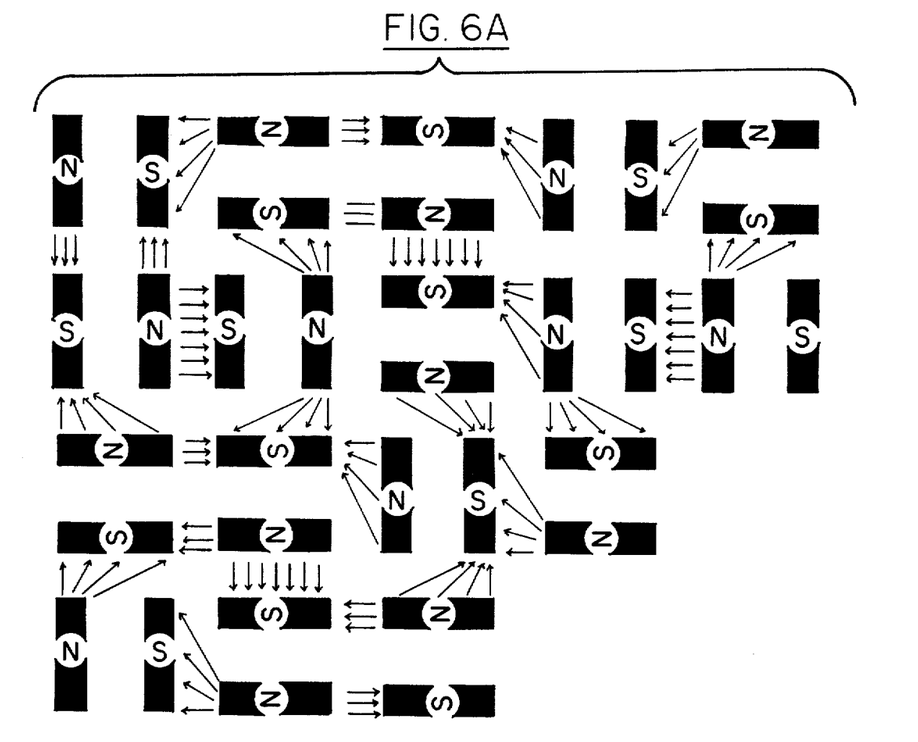
FIG. 6A is an illustration showing the magnetic lines of force relating to the spots in FIG. 6.

In the preferred practice of this invention, the spots 20 are spaced such that the distances between the two poles 21 and 22 of each spot 20 ($d_1$ in FIG. 6) is greater than the distance between adjacent edges of adjacent spots ($d_2$ in FIG. 6). It is to be noted that the north pole and south pole are defined as the areas disposed across from the pole faces 19A and 19B, respectively, of a horseshoe core 19, wherein the pole faces 19A and 19B magnetize the respective portions of the spot 20 when (a) disposed proximate to the spot and (b) current flows through a coil 33 which is wound about the horseshoe core 19. That is, the portions 21 and 22 are similar in size and shape to the pole faces 19A and 19B which face the portions 21 and 22. Distances $d_1$ and $d_2$ are measured from the closest edges of the poles. When the card is magnetized in this manner, it further confuses a potential counterfeiter since the magnetic fluxes, as illustrated in FIG. 6A, will be flowing in the direction necessary to reach the closest opposite pole, which is in adjacent spots. If the distance $d_1$ between the poles of each spot were less than the distance $d_2$ between adjacent edges of adjacent spots, the magnetic flux would be primarily between the two poles only and would thus be easily decipherable by a potential counterfeiter.

Furthermore, it has been found that the flux pattern is most confusing when the spots 20 are randomly arranged at 45° and 90° with each other.

To practice this invention, it is, of course, necessary to have a coding and a reading device. One device may be capable of performing both the coding and reading functions. A coding and reading device which can be employed is one having a plurality of coding and reading heads complementary to each and every spot 20. It is sometimes desirable to have a reading device which has the sole purpose of reading information from the identification cards without having the capability to change the information such as when a card is used to convey "permanently fixed" information only (for example, for a permanent identification card). In addition, Hall-effect and induction devices, as described later, could be used in these read-only devices. In the alternatives, the encoding and reading devices could have the ability to read the information stored on the card and to recode the card afte this reading with new information.

A coding and reading device using a Hall-effect device for reading which can be employed to read and recode an identification card according to this invention is described and claimed in the aforesaid application Ser. No. 911,588, now U.S. Pat. No. 4,253,017, as is illustrated in FIG. 4.

The simplest function performed by a coding and reading device is to read the condition of the magnetized portions of a spot without changing the magnetization of those portions. To perform this simple reading function, a reading machine with a plurality of horseshoe cores, one for each of the spots on the identification card, can be employed.

As shown in FIG. 4, each horseshoe core 19 is positioned so that one free end of the horseshoe core is adjacent one of the magnetic poles of its complementary spot, for example 21, and the other free end of the magnetic core is adjacent to the other magnetic pole, such as 22, of the spot. The magnetized spots having poles such as 21 and 22 cause magnetic flux to pass through both the horseshoe core 19, and "Hall effect" device 25. A constant control current is passed via wires 23 and 24 into the plate 25. This is in accordance with the conventional "Hall effect" technology which has been known for a great many years. The wire 23 feeds the lower end of the plate 25 about midway along its length and the wire 24 feeds the upper end of plate 25, about midway along its length. If magnetic core 19 has only its residual magnetism, the amount of magnetic flux passing through conducting plate 25 via wires 23 and 24 and, therefore, the output $E_n$ will be minimal. If, however, portion 21 of spot 20 is magnetized so that it is the north pole of the spot 20 and portion 22 is magnetized so that it is the south pole, there will be sufficient flux in core 19 to apply field Beta ($\beta$), in a first direction through the conducting plate 25. This will deflect the current passing through plate 25 from wires 23 and 24 and cause a potential difference to appear on the wires 26 and 27 and, thus, produce voltage $E_n$ which is positive. On the other hand, if the magnetic polarity of the spots 21 and 22 is reversed so that portion 21 is south and portion 22 is north, the flux will be in a second direction which is opposite to said first direction and the voltage $E_n$ will be negative.

In some cases, it is desirable to reverse the polarity of the portions, such as 21 and 22, of spots such as 20. For example, it is in some cases desirable to change the coding on the card in order to indicate a new date of use, or in order to indicate the last port of ingress or egress. It may also be desirable to indicate whether the last use of the card was used for ingress or egress. All of these different operations will require full reversal of the magnetism of at least some of the portions, such as 21 and 22, of at least some of the spots such as 20. When it is desired to do this, the relay coil 28 is energized or deenergized, as the case may be, in order to get the desired polarities of portions such as 21 and 22. While the relay coil 28 is in its desired state of energization or deenergization, as the case may be, the switch 34 is momentarily closed. If relay coil 28 is energized, the armatures 29 and 30 are attracted upwardly and place a positive voltage on wire 31 and negative voltage on wire 32, thus, energizing coils 33 to produce flux in one direction, to produce sufficient magnetization of the portions 21 and 22 in the desired polarity. If, on the other hand, the relay coil 28 is deenergized the same events will happen except that all polarities will be reversed.

In the case of an identification card 10 embodying only one number, such as a social security card, the apparatus to encode the card can be as follows. The apparatus can be comprised of a cabinet-like structure (not shown) into which the blank card 10 can be inserted in a slot for coding. Each of these cabinets would have a panel 50 of pushbuttons (or other type of switches) into which the identification number would be punched to encode the core 10.

Figure 5:
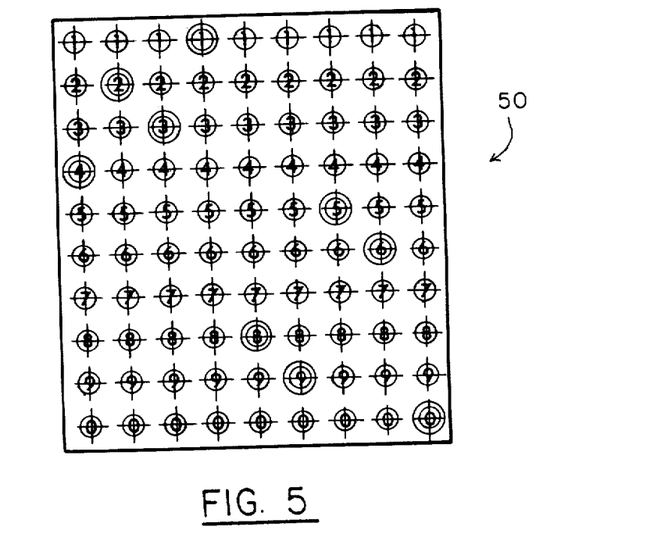
FIG. 5 illustrates an arrangement of toggle switches or pushbuttons that can be employed to code in the proper numbers that are to be magnetically encoded on the identification card, into the device which is going to magnetize the card.
Figure 8:
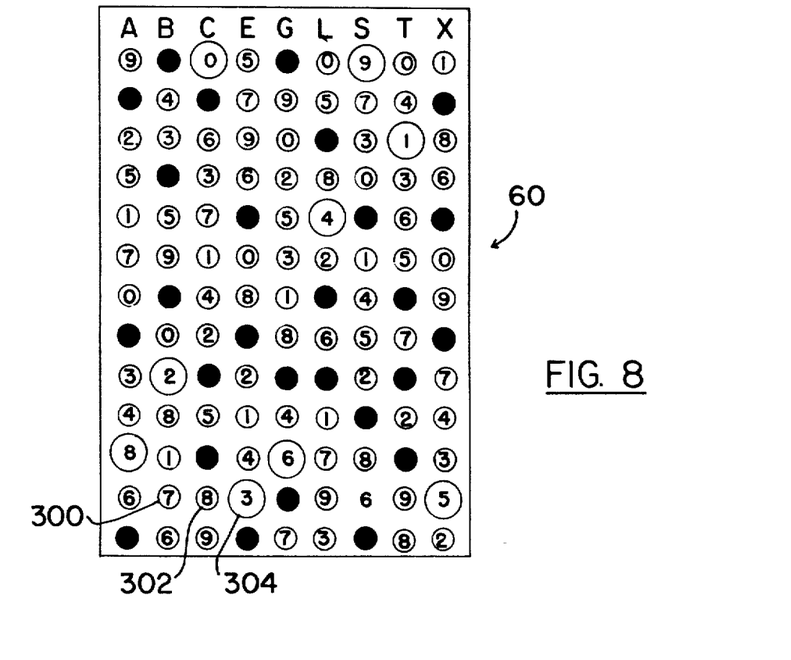
FIG. 8 is a schematic view of a magnetic encoding device according to this invention wherein each numbered circle and black dot represents a coding head within that encoding device.

In the embodiment shown in FIG. 5, there is a panel of p, or more specifically 90, switches which are preferably pushbuttons in an m x n matrix. In FIG. 8 there is represented an r x n array 60 of q, or more specifically 117, spots wherein each of the numbered spots and blackened spots of FIG. 8 has a magnetizing assembly (like that shown in FIGS. 4 and 9) associated therewith. It is noted that in connection with FIG. 8, the x r n array has 13 rows and 9 columns. There is one spot on core 10 for each numeral or blackened spot in FIG. 8. Each of the 90 pushbuttons is connected to operate a relay coil 28 of a designated one of the numbered spots of FIG. 8; that is to say, there are (r−m), or three, spots in each vertical column of FIG. 8 that do not bear numbers. If these three spots are ignored, there are a total of 90 spots in FIG. 8, each of which represents a numeral. Each such numbered spot has its complementary relay coil 28 which is in turn controlled by a complementary pushbutton on the panel of FIG. 5. Further, it is preferred that a column in FIG. 5 has a corresponding column in FIG. 8, each such column including common inputs. However, the sequence of vertical columns of FIG. 5 does not correspond with the sequence of vertical columns in FIG. 8, the FIG. 8 columns being juxtaposed relative to the columns in FIG. 5. In addition, the sequence of inputs in each column in FIG. 5 differs from the sequence of inputs in the corresponding FIG. 8 column. For convenience of coding, the inputs in FIG. 5 are in a prescribed order in each column, with the columns themselves being in a predefined sequence. To confound the would-be counterfeiter, the inputs in FIG. 8 are disordered relative to the pattern set forth in FIG. 5. By way of example, pressing a given pushbutton in the first vertical column of FIG. 5 actuates the correspondingly numbered spot in vertical column L instead of the corresponding numbered spot in column A of FIG. 8. Similarly, depressing a pushbutton in the second vertical column of FIG. 5 actuates the relay coil of the correspondingly numbered spot in the vertical column B of FIG. 8. Depressing a pushbutton in the third vertical column of FIG. 5 actuates the relay coil 28 for the correspondingly numbered spot in vertical column E of FIG. 8. Similarly, depressing a pushbutton in the fourth vertical column of FIG. 5 actuates the relay coil 28 associated with the correspondingly numbered spot in vertical column T of FIG. 8. Depressing a pushbutton in the fifth vertical column of FIG. 5 actuates the relay coil 28 of the correspondingly numbered spot in vertical column A of FIG. 8. Similarly, depressing a pushbutton in the sixth vertical column of FIG. 5 actuates the relay coil of the correspondingly numbered spot in vertical column S of FIG. 8. Similarly, depressing a pushbutton in the seventh vertical column of FIG. 5 energizes the relay coil 28 for the correspondingly numbered spot in vertical column X of FIG. 8. In like manner, depressing a pushbutton in the next to the last vertical column of FIG. 5 energizes the relay coil 28 associated with the correspondingly numbered spot in vertical column G of FIG. 8. Finally, depressing a pushbutton in the last vertical column of FIG. 5 energizes a relay coil 28 in the vertical column C of FIG. 8. Therefore, if the operator depresses the pushbuttons in the nine vertical columns of FIG. 5 to key in the social security number 423 18 9560, he will do this by depressing pushbutton 4 in the first vertical column in FIG. 5, the pushbutton 2 in the second vertical column in FIG. 5, the pushbutton 3 in the third vertical column in FIG. 5, etc. This will energize the relay coil 28 associated with spot 8 in vertical column A of FIG. 8, the relay coil 28 associated with the spot 2 of vertical column B of FIG. 8, the relay coil 28 corresponding to the spot O in vertical column C of FIG. 8, etc. Therefore, the entire number will be entered into the permanent magnets of FIG. 8 but the columns will be staggered. In order to read the columns to get the correct social security number, it is necessary to read them in the following order:

L B E T A S X G C.

After the proper numbers have been entered in panel 50, the operator activates the master switch, switch 34, such that electricity flows through wires 31 and 32 and coils 33 in the direction dictated by double throw relay 28, 30 (see FIG. 4).

Consequently, if the number 423 18 9560 is the number being coded into the card, the various spots 20 on the magnetizable core 10 will be magnetized to represent the number according to the direction in which the relay coils and horseshoe cores represented in FIG. 8 are activated.

The black circles of FIG. 8 represent 27 horseshoe core and relay coil assemblies that are magnetized without respect to the number being encoded on core 10. They are magnetized at random by any suitable means which will cause the horseshoe core and relay coil assembly represented by the spot to be magnetized one way or the other. The fact that these various spots (other than the ones used to represent the social security number) are magnetized at random, will, of course, help confuse a counterfeiter. When I state that the spots (other than those used to represent the social security number) are magnetized at random, I do not mean that some are magnetized and others are not; but I mean that the given orientation of the horseshoe core and relay coil assembly, as to magnetizing a spot, will be at random. In this respect it is noted that each of these spots where there is to be random magnetization, there is a Hall-effect horseshoe magnet 19 together with its associated relay coil 28 and double-throw switch 29, 30 (represented by a black dot). Any suitable means which continuously opens and closes the circuit to the relay coil 28 of the relay coils represented by the black circles will provide the necessary random magnetization; it being understood that the means which energizes the relay coils 28 in a random fashion are energizing some of the relay coils 28 when others are de-energizing and changing the pattern from time to time at which the random in energization of relay coils 28 occurs.

As a result of the random energization of the 27 spots other than the ones representing the social security number, any counterfeiter would be faced with a very confusing magnetic field resulting from the spots 20 of core 10, and it would, therefore, be a virtually impossible task for him to pick out the spots 20 which actually represent the social security number and isolate them from the other 27 spots which are magnetized at random.

Figure 9:
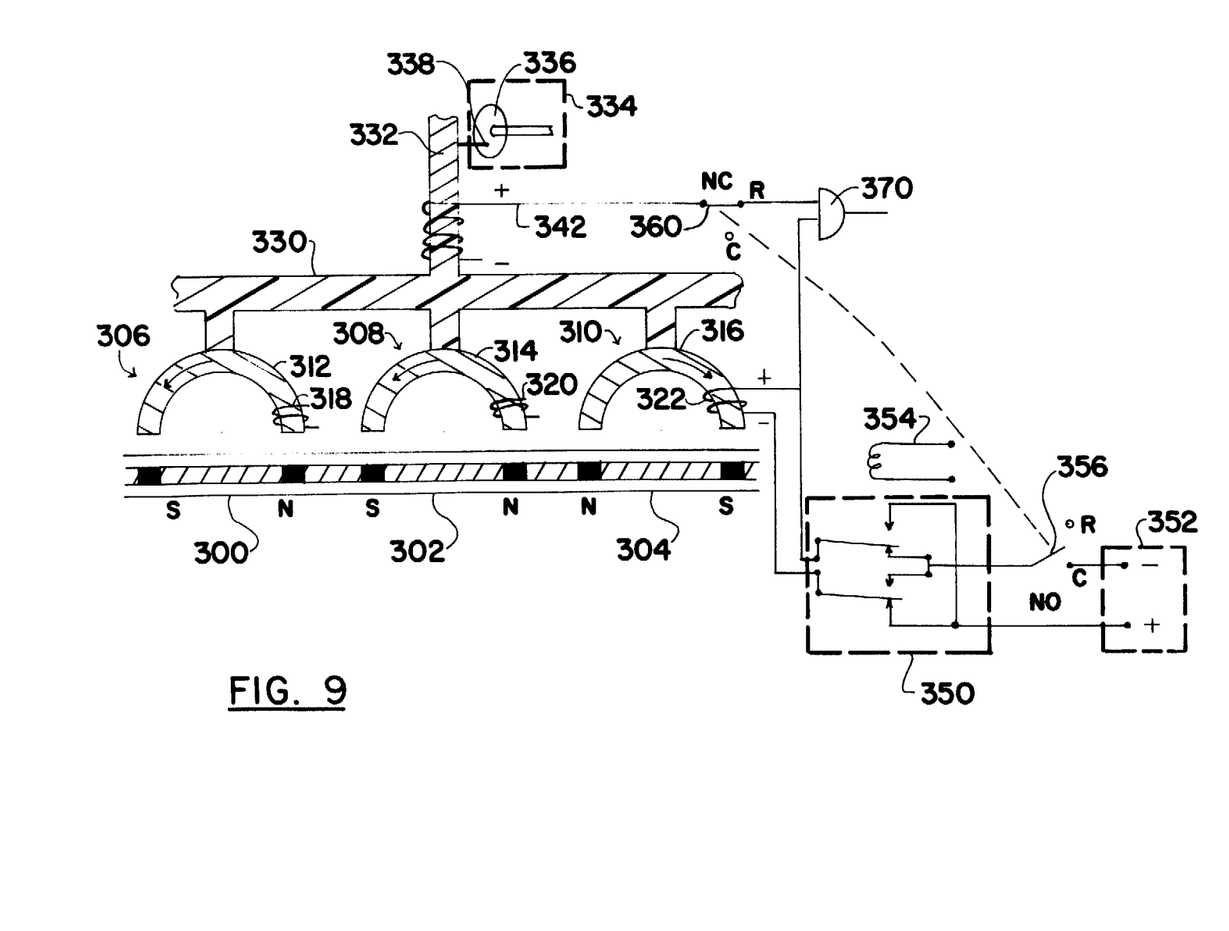
FIG. 9 is an illustration of an induction device which could be used to code or read the spots on the identification card.

Referring to FIG. 9, apparatus is shown for coding and reading magnetic inputs on sample spots 300, 302, and 304 of a card like that shown in FIGS. 1 and 2. Associated with each spot 300, 302, and 304 is a magnetizing assembly 306, 308, and 310, respectively. Each magnetizing assembly comprises (a) a horseshoe core 312, 314, and 316, respectively, and (b) a coil 318, 320, and 322 wound about one of the horseshoe cores 312, 314, and 316, respectively. Each horseshoe core 312, 314, and 316 is made of a highly magnetizable material through which magnetic flux freely flows and includes pole faces 312A and 312B, 314A and 314B, and 316A and 316B which face magnetizable portions —shown with N and S designations—of respective spots. The N and S designations indicate the opposite magnetic polarities (North and South) of the two portions of a given spot. Each magnetizing assembly 306, 308, and 310 is similar in configuration to the magnetizing assembly 310 which, by way of example, is shown in detail in FIG. 9.

It will be noted that the magnetizing assembly 310 (and each other magnetizing assembly) is used to perform two functions—(a) "coding", or selectively determining the direction of magnetization, on a spot, and (b) "reading", or detecting, the direction of magnetization of a spot. The horseshoe core 316 is shown affixed to a non-magnetic yoke 330—which is common to some, if not all, of the horseshoe cores. Extending from the yoke 330 is a plunger 332 which is moved up and down by a displacing device 334. The displacing device 334 is shown as a rotatable disc 336 with an eccentric connector 338 which is attached to the plunger 332. Alternatively, the device 334 may include a cam-operated device, or other such conventional mechanism. The plunger 332 has a first sectional length which comprises a magnetizable element, such as iron, and a second sectional length of a relatively non-magnetizable element, such as plastic. A stationary coil 340 is wound about the plunger 332. When the plunger 332 is in a raised position, the coil 340 surrounds the non-magnetizable material. When the plunger 332 is lowered, the coil 340 surrounds the magnetizable material of the plunger 332, current being induced in a line 342 when the plunger 332 moves.

To code the spot 304, the horseshoe core 316 is lowered by action of the displacing device 334 to a point at which the providing of magnetic flux in the horseshoe core 316 magnetizes the portions of the spot 304 with appropriate north (N) or south (S) polarities. Flux to the horseshoe core 316 is produced by driving a current in either direction through the coil 322. The direction of the current is determined by a double-throw relay 350 which connects the two ends of the coil 322 to the negative terminal and positive terminal of a d.c. source 352, respectively, or, with the terminals reversed, to the positive and negative terminals, respectively. The relay 350 is toggled by a relay coil 354. A normally open (NO) master switch 356 having read (R) and code (C) positions selectively connects or disconnects the source 352 to the coil 322. With switch 356 closed and with the horseshoe core 316 lowered proximate to the spot 304, current through the coil 322 will cause the portions of the spot 304 to magnetize appropriately. That is, with the relay 350 as shown, magnetic flux in the horseshoe core 316 flows clockwise, such that the left portion of the spot 304 is north (N) and the right portion is south (S). Switching the relay 350 from the position shown will result in the left portion of the spot 304 being magnetized south (S) and the right portion being magnetized north (N) as shown with respect to spots 300 and 302.

Ganged to the switch 356 which preferably selectively connects and disconnects a common source to all coils is a normally closed (NC) switch 360 connected along line 342. Switches 356 and 360 may, of course, be normally closed and normally open, respectively, if desired. It is only required that the magnetizing assemblies not code and read simultaneously. The closing of switch 360 indicates that the magnetizing assemblies 306 through 310 are in the "read" mode. (The switching open of the switch 360 and the related switching closed of the switch 356 indicate the "code" mode.) In the "read" mode, movement of the plunger 332 causes a current to be induced (a) in coil 340 and (b) in coils 318, 320, and 322.

Again referring to the magnetizing assembly 310, it is noted that the current induced in the coil 322 in the "read" mode will be in a positive or negative direction depending on the direction of magnetization of the spot 304. As shown, the upper part of the coil 322 becomes relatively more positive as the horseshoe core 316 is lowered. Similarly, as the plunger 332 lowers, the upper part of coil 340 becomes relatively more positive. Connecting the upper part of coil 322 as one input to an AND gate 370 and connecting line 342, via switch 360, as the other input to the gate 370, the output from the gate 370 indicates whether the spot 304 is magnetized in one preselected direction. If desired, a capacitor may be connected to ground from either or both inputs to the AND gate 370 to lengthen the period of input to the gate 370.

According to the invention, each spot is associated with a particular letter, or other indicia, which is indicated as present or absent on the card based on the direction of magnetization of the spot. That is, spot 304 may correspond to the presence of the numeral 3 at a particular location on the card (relative to other numerals) because the left portion of the spot 314 is north (N). As previously discussed, this direction of polarization results in an output from the AND gate 370 which represents the presence of the numeral 3. The numeral 3 is not indicated as present when the spot 314 is oppositely magnetized, i.e., with the left portion being south (S).

It is, of course, noted that numerous magnetizing assemblies, such as assemblies 306 and 308, code and read in the same manner as described relative to magnetizing assembly 310. Accordingly, if spot 300 represents the numeral 7 and spot 302 represents the numeral 8, the respective directions of magnetization thereof indicate the absence of numeral 7 and the absence of numeral 8 as represented by the spots 300p and 302.

Referring to FIG. 8, the operation of the magnetizing assemblies 306 through 310 becomes more readily apparent. Spots 300, 302, and 304 are shown to represent numerals 7, 8 and 3, respectively, in a row of the array of spots shown. Over each spot is a magnetizing assembly as shown in FIG. 9. Spot 304 is magnetized with the left portion as north (N) and is distinguished in FIG. 8 by a large circle drawn around it. The other numerals circumscribed by circles correspond to spots magnetized in a predetermined direction, the remaining numerals corresponding to spots having oppositely directed magnetization. In the embodiment of FIG. 8, only one numeral per column is selected to be present. It is also noted that the blackened spots illustrated in FIG. 8 represent dummy spots which do not represent numerals and, thus, the direction of magnetization of the dummy spots are not detected during reading. The magnetizing assembly for each dummy spot may include a write circuit (not shown) which randomly magnetizes or periodically remagnetizes the corresponding dummy spot. (A "code" circuit like that shown in FIG. 9, wherein the relay element is arbitrarily switched, may be employed.) However, no "read" circuit need be provided therefor. Specifically, the coil around a horseshoe core which faces a dummy spot need not be and, preferably, is not connected to a gate for further processing, as is the output from gate 370. The inclusion of dummy spots thus confounds a prospective counterfeiter who is unable to determine from the card itself what the contents thereon indicate.

Figure 7:
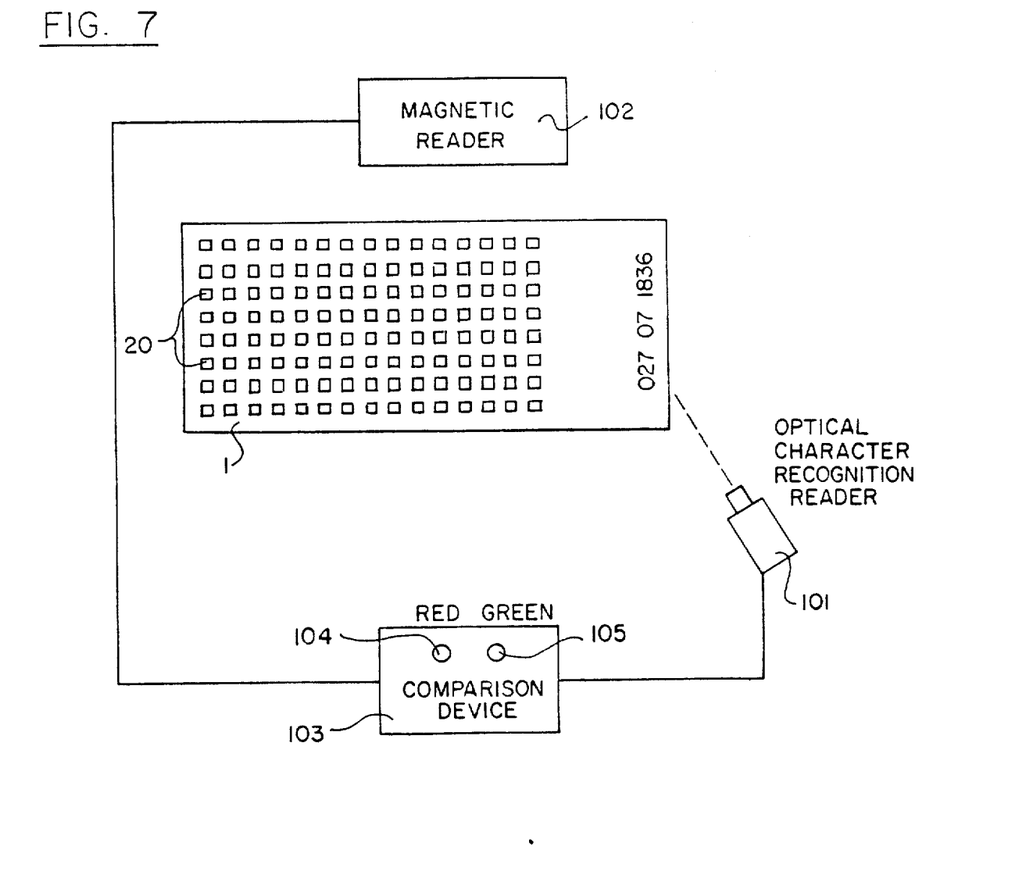
FIG. 7 illustrates one embodiment of a method and means for reading and decoding an identification card.

If an automatic comparison device (described below) such as shown in FIG. 7 is used, the various sets of wires 310, representing the different magnetized spots, would constitute the magnetic reader 102.

The identification number of the card (which could be the social security number) and other information can be encoded on the card in a manner such that the information can be read by OCR readers as shown in FIG. 7. The numerals are typed, printed, recorded, etc., on card 1 in a type style which can be read by optical character recognition reader 101. Alternatively, a keyboard or console (not shown) can have pushbuttons or other switches which may be actuated to provide the identification number or social security number on the card. These inputs can be compared with the information detected from the magnetized spots on the card. In the OCR embodiment, the output of the OCR reader 101 can be compared with the reading from magnetic reader 102, which is comprised of a number of horseshoe cores 19 (which in the preferred embodiment is a scanning device) as shown in FIG. 4, by comparison device 103. Comparison device 103 has two indicating lights, red light 104 to indicate if the decoded information does not match, and green light 105 to indicate that the decoded information is the same. If the numerals read by the OCR reader 101 or corresponding to the pushed buttons on the keyboard (not shown) and the magnetic reader 102 are the same, the green light 105 is energized to indicate that the card is authentic. If readers 101 and 102 have outputs indicating different numerals, the red light 104 is energized.

Referring now to FIG. 3, an arrangement of 350 spots which may be used on a passport is illustrated. Eighty of the 350 spots have been arbitrarily set aside to represent the serial number of the identification card. Of these 80 spots which are set aside to represent the serial number, eight spots have been magnetized to represent the identification number. The remaining 72 spots have been magnetized in a manner to indicate that they are not part of the identification number. The eight selected spots, of the 80 spots, represent the serial number of the card and for purposes of illustration, for a representative case, have been enclosed in a circle in FIG. 3. Thus, the eight digits of the serial number of the card in FIG. 3 would be 71342685. This would be verified when the card is submitted to a customs agent because he would put the card into a reading machine which would have separate cores, as discussed above, to read each of the 80 spots. Seventy-two of the spots would produce voltages $E_n$ of negative polarity. The other eight spots would produce positive voltages at output $E_n$ of their reading device and the computer would detect this and assign the proper values to the respective spots, and thus reconstruct the serial number and check it for validity.

It may also be desirable to have the expiration date of the card set forth in the coded information. Therefore, 50 of the 350 spots can be set aside for the expiration date. Forty-five of these 50 spots would have their respective portions 21 and 22 polarized opposite the polarity of portions 21 and 22 of the remaining five spots. The five spots would indicate the expiration date of the card. Those five spots are enclosed in squares on FIG. 3 and, therefore, the expiration date of the card of FIG. 3 would be 25314.

Of the 350 spots, 30 are set aside in this example to indicate the last port of ingress or egress. Of these 30 spots, three are selected to represent a given port. Fifty spots are set aside in this example to represent the date of last use of the card. All dates are coded so that among the 50 spots any particular date can be represented by energizing, with proper polarity, only five spots. The other 45 spots, reserved for indicating the date, are, of course, subjected to a magnetic field, but in the opposite direction from the five spots that were represented to select the date.

Therefore, at each port of entry, when the card according to this embodiment is presented to the customs agent, he will first place it into the reading machine which will read all of the information on the card such as the serial number, the expiration date, the place where the card was last used, and the date of last use. The computer connected to the reading machine will tell him whether the serial number is valid, whether the card has expired, and will indicate to him the place and date of last use. After the customs agent has seen for himself that the holder of the identification card is entitled to enter the country, he will then press the necessary button for that day to energize the proper solenoids to remagnetize the 30 spots representing the place where the card was used, to thus code those 30 spots to represent the identification number of the port of entry, and at the same time the device will remagnetize the 50 spots relating to the date of use so that five of these spots are magnetized in such a manner as to indicate the date on which the operation is taking place.

In connection with FIG. 3, the card may also be checked in the system of FIG. 7 to verify the identity of the serial number of the card as printed thereon and as recorded magnetically thereon.

While a card with 350 spots has been illustrated in FIG. 3 and discussed above, almost any number of spots (limited by the size of the card) in any arrangement can be employed.

For example, instead of using the digital system shown in FIGS. 3 and 5, the spots that are set aside for the serial number could be magnetized according to the binary system to thus indicate the serial number. Similarly, the spots set aside for conveying the other information could be magnetized according to the binary system to represent the expiration date.

If the binary system is used, the spots could be coded as follows. If portion 21 is the north pole and portion 22 is the south pole, the spot would represent binary 0. On the other hand, if the portion 21 is the south pole, and the portion 22 is the north pole, the spot would represent binary 1.

To deter in-house counterfeiting, sealed counter 41, shown in FIG. 4, could be attached to master switch 34. Therefore, an accurate count of the cards encoded by each particular encoding device could be kept to prevent an insider from running off countless dummy cards for illegal use. The magnetic steel used for the core of the card is serially numbered by the manufacturer. This number must match the serial number printed on the vinyl assembly. The sealed counter must match the serial number of the steel core and the engraved cover.

The identification cards described above are truly counterfeit-proof and tamper-proof. There are hundreds and hundreds of millions of possible magnetic combinations of polarities as well as an unlimited number of combinations of the heads of the reading and coding devices.

Once given the above disclosure, many other features, modifications, and improvements will become apparent to the skilled artisan. Other such features, modifications, and improvements are, therefore, considered to be part of this invention, the scope of which is to be determined by the following claims:

I claim:

1. Apparatus for providing substantially counterfeit-proof identification device comprising:
an identification card comprising:
a magnetizable layer including a plurality q of magnetizable spots disposed thereon, each spot having two portions wherein (a) the first portion is of one magnetic polarity, (b) the second portion is of the other polarity, and (c) the two portions are spaced apart by a distance $d_1$;
wherein adjacent spots are spaced apart, the distance $d_2$ between (a) a portion of one polarity on one spot and (b) a portion of the opposing polarity on an adjacent spot is less than the distance $d_1$.

2. Apparatus according to claim 1 further comprising:
a plurality of magnetizing assemblies, each magnetizing assembly comprising (a) a horseshoe core having two pole faces and (b) a coil wound about the horseshoe core, one of the two pole faces being disposed at a distance from the first portion of a corresponding spot and the other pole face being disposed at a distance from the second portion of the corresponding spot.

3. Apparatus according to claim 2 further comprising:
means for determining the spacing between the pole faces of the horseshoe core and the respective portions of the spots, the spacing determining means (a) being connected to each magnetizing assembly and (b) including means for moving the pole faces and the respective portions relative to each other.

4. Apparatus according to claim 3 wherein the moving means comprises:
a common yoke to which all magnetizing assemblies are attached; and
means for displacing the common yoke toward or away from the spots, the displacing means being coupled to the common yoke 5. Apparatus according to claim 3 further comprising:
a source of current;
means for selecting the direction of magnetization of a plurality p of the q spots, the magnetization determining means including:
an m x n matrix (where p=m·n) of the p switches, each switch connecting the source across the coil of one corresponding magnetizing assembly in either of two selectable polarities, a spot being magnetized (a) when the moving means moves the corresponding pole faces and respective portions close to each other within a predefined spacing and (b) in the direction corresponding to the direction of current from the source through the coil wound about the corresponding horseshoe core.

6. Apparatus according to claim 5 wherein each switch in the m x n switch matrix represents a binary input, the switches being arranged such that binary inputs represented thereby are in an order pattern wherein (a) each of the n columns of switches represents a serially ordered set of binary inputs and (b) the n columns are arranged as a sequence of the ordered sets.

7. Apparatus according to claim 6 wherein each serially ordered set corresponds to a serial ordered set of numeric elements, the selective switching of the switch corresponding to a binary input in the serial numeric ordered set indicating either the presence or absence of the numeric element.

8. Apparatus according to claim 5 wherein the m x n matrix of p switches connect to only p corresponding spots through p corresponding magnetizing assemblies; and wherein the apparatus further comprises:
means for providing input current to the remaining (q−p) magnetizing assemblies to determine the direction of magnetization of the corresponding (q−p) spots when the moving means moves the horseshoe cores and spots proximate to each other, the (q−p) spots representing dummy spots, each of which does not correspond to a binary input in any of the ordered sets of binary inputs.

9. Apparatus according to claim 8 wherein (a) the p spots which correspond to the p switches in the m x n matrix and (b) the (q−p) dummy spots from an r x n array of spots which is disordered relative to the pattern of corresponding switches in the matrix of switches.

10. Apparatus according to claim 9 wherein the switches in one column of the switch matrix control the direction of magnetization of spots in a corresponding column of the spot array wherein (a) the n columns in the spot array are juxtaposed with respect to the sequence of the n columns in the switch matrix and (b) each column in the spot array includes (r−m) dummy spots.

11. Apparatus according to claim 10 wherein the spots in each column in the spot array are in an order which differs from the order of the respective switches in the switch matrix column corresponding thereto.

12. Apparatus according to claim 5 further comprising:
means for detecting the direction of magnetization of only each of the p spots the direction of magnetization of which is determined by the p switches in the m x n switch matrix.

13. Apparatus according to claim 12 wherein the detecting means comprises:
the moving means;
the coil wound about each respective horseshoe core;
a switch for selectively connecting and disconnecting the source;
means for generating a current when the spots and the corresponding horseshoe cores move towards each other, the current generating means being responsive to movement caused by the moving means;
an AND gate associated with each horseshoe core, the AND gate having one input connected to the coil when the source is disconnected therefrom and the other input being connected to receive current from the current generating means; and
an output from the AND gate indicating that the spot corresponding thereto is magnetized in a predetermined direction.

14. Apparatus according to claim 13 wherein the position of at least one horseshoe core is transverse relative to the position of an adjacent horseshoe core.

15. Apparatus according to claim 2 wherein the position of at least one horseshoe core is transverse relative to the position of an adjacent horseshoe core.

16. Apparatus for providing substantially counterfeit-proof identification device comprising:
an identification card comprising:
a magnetizable layer including a plurality q of magnetizable spots disposed thereon, each spot having two portions wherein (a) the first portion is of one magnetic polarity, and (b) the second portion is of the other polarity;
a polarity of magnetizing assemblies, each magnetizing assembly comprising (a) a horseshoe core having two pole faces and (b) a coil wound about the horseshoe core, one of the two pole faces being disposed at a distance from the first portion of a corresponding spot and the other pole face being disposed at a distance from the second portion of the corresponding spot;

means for determining the spacing between the pole faces of the horseshoe core and the respective portions of the spots, the spacing determining means (a) being connected to each magnetic assembly and (b) including means for moving the horseshoe cores and spots relative to each other;

a source of current;

means for selecting the direction of magnetization of a plurality p of the q spots, the magnetization determining means including:

an m x n matric (where p=m·n) of the p switches, each switch connecting the source across the coil of one corresponding magnetizing assembly in either of two selectable polarities, a spot being magnetized (a) when the moving means moves the corresponding pole faces and respective portions close to each other within a predefined spacing and (b) in the direction corresponding to the direction of current from the source through the coil wound about the corresponding horseshoe core.

17. Apparatus according to claim 16 wherein each switch in the m x n switch matrix represents a binary input, the switches being arranged such that binary inputs represented thereby are in an ordered pattern wherein (a) each of the n columns of switches represents a serially ordered set of binary inputs and (b) the n columns are arranged as a sequence of the ordered sets.

18. Apparatus according to claim 17 wherein each serially ordered set corresponds to a serially ordered set of numeric elements, the selective switching of the switch corresponding to a binary input in the serial numeric ordered set indicating either the presence or absence of the numeric element on the card.

19. Apparatus according to claim 16 wherein the m x n matrix of p switches connects to only p corresponding spots through p corresponding magnetizing assemblies; and wherein the apparatus further comprises:

means for providing input current to the remaining (q−p) magnetizing assemblies to determine the direction of magnetization of the corresponding (q−p) spots when the moving means moves the corresponding pole faces and respective portions close to each other within a predefined spacing, the (q−p) spots representing dummy spots, each of which does not correspond to a binary input in any of the ordered sets of binary inputs.

20. Apparatus according to claim 19 wherein (a) the p spots which correspond to the p switches in the m x n matrix and (b) the (q−p) dummy spots form an r x n array of spots which is disordered relative to the pattern of corresponding switches in the matrix of switches.

21. Apparatus according to claim 20 wherein the switches in one column of the switch matrix control the direction of magnetization of spots in a corresponding column of the spot array wherein (a) the n columns in the spot array are juxtaposed with respect to the sequence of the n columns in the switch matrix and (b) each column in the spot array includes (r−m) dummy spots.

22. Apparatus according to claim 21 wherein the spots in each column in the spot array are in an order which differs from the order of the respective switches in the switch matrix column corresponding thereto.

23. Apparatus according to claim 16 further comprising:

means for detecting the direction of magnetization of only the p spots, the direction of magnetization of each of the p spots being selected by a corresponding one of the p switches in the m x n switch matrix.

24. Apparatus according to claim 12 wherein the detecting means comprises:

a plurality of p Hall-effect devices each of which is disposed proximate to a corresponding horseshoe core, each Hall-effect device being oriented so as to provide an output current indicative of the direction of magnetic flux passing through the corresponding horseshoe core.

25. Apparatus according to claim 24 wherein each horseshoe core comprises two elements separated by a small gap therebetween, the Hall-effect device corresponding thereto being positioned within each such gap.

26. Apparatus for providing a substantially counterfeit-proof identification device, the apparatus comprising:

an identification card having thereon a magnetizable spot having a first portion of one polarity and a second portion of opposite polarity, the two portions thereby indicating the direction of magnetization of the spot;

a magnetizing assembly associated with the magnetizable spot, the magnetizing assembly comprising (a) a horseshoe core having two pole faces and (b) a coil wound about the horseshoe core, the two pole faces being positionable into close proximity with the two portions of the spot, respectively;

means for detecting the direction of magnetization of the spot, wherein the detecting means comprises a Hall-effect device disposed proximate to the horseshoe core, the Hall-effect device being oriented so as to provide an output signal indicative of the direction of magnetic flux passing through the horseshoe core.

27. Apparatus according to claim 26 wherein the horseshoe core comprises two elements separated by a small gap therebetween, the Hall-effect device corresponding thereto being positioned within such gap.

28. Apparatus according to claim 27 wherein magnetic flux in the horseshoe core passes through the Hall-effect device in either of two opposite directions depending on the direction of magnetization of the magnetizable spot and an electric field is applied across the Hall-effect device in a direction transverse to the direction of the magnetic flux passing through the Hall-effect device, the output signal comprising a current which is (a) transverse to both the direction of the electric field across and the magnetic flux through the Hall-effect device and (b) in either of two opposite directions depending on the direction of magnetic flux through the Hall-effect device.

29. Apparatus according to claim 28 further comprising:

coding means for applying current in either of two opposite directions to the coil wound around the horseshoe core, the direction of applied current determining the direction of magnetization of the spot; and means, associated with the coding means and detecting means, for selectively enabling only the coding means or only the detecting means at any given time.

* * * * *